(12) United States Patent
Kilfoyle et al.

(10) Patent No.: US 7,710,913 B2
(45) Date of Patent: May 4, 2010

(54) METHOD AND SYSTEM FOR A CHANNEL SELECTIVE REPEATER WITH CAPACITY ENHANCEMENT IN A SPREAD-SPECTRUM WIRELESS NETWORK

(75) Inventors: Daniel B. Kilfoyle, Falmouth, MA (US); Travis H. Slocumb, III, Washington, DC (US); Steven Carson, Washington, DC (US)

(73) Assignee: Science Applications International Corporation, San Diego, CA (US)

( * ) Notice: Subject to any disclaimer, the term of this patent is extended or adjusted under 35 U.S.C. 154(b) by 1157 days.

(21) Appl. No.: 11/287,225

(22) Filed: Nov. 28, 2005

(65) Prior Publication Data

US 2006/0083196 A1    Apr. 20, 2006

Related U.S. Application Data

(60) Division of application No. 10/259,395, filed on Sep. 30, 2002, now Pat. No. 7,006,461, which is a continuation-in-part of application No. 09/953,157, filed on Sep. 17, 2001, now Pat. No. 7,061,891.

(51) Int. Cl.
*H04B 7/26* (2006.01)

(52) U.S. Cl. .............. 370/328; 455/17; 455/19; 455/101; 375/221; 375/222; 375/246

(58) Field of Classification Search .......... 455/17, 455/19, 20–21, 101, 103, 522, 436; 375/221–222, 375/231, 246; 330/310, 326
See application file for complete search history.

(56) References Cited

U.S. PATENT DOCUMENTS 523,930 A    7/1894   Ehrlich

| | | |
|---|---|---|
| 3,879,664 A | 4/1975 | Monsen ................. 375/232 |
| 3,916,311 A | 10/1975 | Martin et al. ............ 455/14 |
| 4,284,843 A | 8/1981 | White ..................... 178/69 G |

(Continued)

FOREIGN PATENT DOCUMENTS

EP    0 418 096    3/1991

(Continued)

OTHER PUBLICATIONS

Verdu, S., "Minimum Probability of Error for Asynchronous Gaussian Multiple-Access Channels," *IEEE Transactions on Information Theory*, vol. IT-32, No. 1, Jan. 1986, pp. 85-96.

(Continued)

*Primary Examiner*—Dang T Ton
*Assistant Examiner*—Mohamed Kamara
(74) *Attorney, Agent, or Firm*—King & Spalding LLP

(57) ABSTRACT

The present invention relates to a system and method for extending the coverage area and communication capacity of a spread-spectrum based wireless network through the use of intelligent repeaters. The system comprises a wireless communication network augmented with low cost channel selective repeaters that is capable of repeating only desired signals, thereby suppressing undesirable interference and increasing network capacity. The repeaters can be integrated into an existing wireless network with minimal impact to the existing network layer topology or control structure.

2 Claims, 11 Drawing Sheets

U.S. PATENT DOCUMENTS

| | | | |
|---|---|---|---|
| 4,901,307 A | 2/1990 | Gilhousen et al. | 370/18 |
| 5,152,002 A | 9/1992 | Leslie et al. | 455/11.1 |
| 5,187,806 A | 2/1993 | Johnson et al. | 455/15 |
| 5,440,642 A | 8/1995 | Denenberg et al. | 381/71.13 |
| 5,627,881 A | 5/1997 | Fletcher | 379/60 |
| 5,652,765 A | 7/1997 | Adachi et al. | 375/211 |
| 5,684,491 A | 11/1997 | Newman et al. | 342/274 |
| 5,719,852 A | 2/1998 | Schilling et al. | 370/201 |
| 5,754,961 A | 5/1998 | Serizawa et al. | 455/517 |
| 5,765,099 A | 6/1998 | Georges et al. | 455/14 |
| 5,794,149 A | 8/1998 | Hoo | 455/438 |
| 5,809,398 A | 9/1998 | Moberg et al. | 455/17 |
| 5,809,422 A | 9/1998 | Raleigh et al. | 455/449 |
| 5,812,933 A | 9/1998 | Niki | 455/16 |
| 5,828,658 A | 10/1998 | Ottersten et al. | 370/310 |
| 5,835,848 A | 11/1998 | Bi et al. | 455/24 |
| 5,867,485 A | 2/1999 | Chambers et al. | 370/281 |
| 5,875,209 A | 2/1999 | Ogata | 375/211 |
| 5,887,261 A | 3/1999 | Csapo et al. | 455/450 |
| 5,898,740 A | 4/1999 | Laakso et al. | 375/346 |
| 5,904,470 A | 5/1999 | Kerrebrock et al. | 415/115 |
| 5,930,243 A | 7/1999 | Parish et al. | 370/334 |
| 5,930,293 A | 7/1999 | Light et al. | 375/211 |
| 5,936,754 A | 8/1999 | Ariyavisitakul et al. | 359/145 |
| 5,940,384 A | 8/1999 | Carney et al. | 370/347 |
| 5,953,325 A | 9/1999 | Willars | 370/335 |
| 5,956,333 A | 9/1999 | Zhou et al. | 370/342 |
| 5,970,410 A | 10/1999 | Carney et al. | 455/446 |
| 5,987,333 A | 11/1999 | Sole | 455/522 |
| 5,991,345 A | 11/1999 | Ramasastry | 375/347 |
| 6,002,727 A | 12/1999 | Uesugi | 375/346 |
| 6,014,373 A | 1/2000 | Schilling et al. | 370/342 |
| 6,031,877 A | 2/2000 | Saunders | 375/267 |
| 6,035,218 A | 3/2000 | Oh et al. | 455/562 |
| 6,052,558 A | 4/2000 | Cook et al. | 455/12.1 |
| 6,061,553 A | 5/2000 | Matsuoka et al. | 455/273 |
| 6,078,823 A | 6/2000 | Chavez et al. | 455/562 |
| 6,081,516 A | 6/2000 | Yoshida et al. | 370/342 |
| 6,085,075 A | 7/2000 | Van Bezooijen | 455/260 |
| 6,088,335 A | 7/2000 | I et al. | 370/252 |
| 6,097,928 A | 8/2000 | Jeon | 455/8 |
| 6,100,843 A | 8/2000 | Proctor, Jr. et al. | 342/368 |
| 6,101,399 A | 8/2000 | Raleigh et al. | 455/561 |
| 6,104,933 A | 8/2000 | Frodigh et al. | 455/522 |
| 6,108,364 A | 8/2000 | Weaver, Jr. et al. | 375/130 |
| 6,108,564 A | 8/2000 | Minkoff | 455/561 |
| 6,108,565 A | 8/2000 | Scherzer | 455/562 |
| 6,115,409 A | 9/2000 | Upadhyay et al. | 375/144 |
| 6,118,983 A | 9/2000 | Egusa et al. | 455/69 |
| 6,119,010 A | 9/2000 | Labedz | 455/446 |
| 6,131,049 A | 10/2000 | Marsan et al. | 455/574 |
| 6,137,784 A | 10/2000 | Wallerius et al. | 370/328 |
| 6,137,843 A | 10/2000 | Chennakeshu et al. | 375/340 |
| 6,141,533 A | 10/2000 | Wilson et al. | 455/11.1 |
| 6,141,567 A | 10/2000 | Youssefmir et al. | 455/562 |
| 6,154,485 A | 11/2000 | Harrison | 375/130 |
| 6,157,619 A | 12/2000 | Ozluturk et al. | 370/252 |
| 6,163,524 A | 12/2000 | Magnusson et al. | 370/208 |
| 6,166,705 A | 12/2000 | Mast et al. | 343/853 |
| 6,167,031 A | 12/2000 | Olofsson et al. | 370/252 |
| 6,252,540 B1 | 6/2001 | Hale et al. | 342/159 |
| 6,301,293 B1 | 10/2001 | Huang et al. | 375/206 |
| 6,314,147 B1 | 11/2001 | Liang et al. | 375/346 |
| 6,370,185 B1 | 4/2002 | Schmutz et al. | 375/214 |
| 6,405,046 B1 | 6/2002 | Kumaran et al. | 455/453 |
| 6,418,148 B1 | 7/2002 | Kumar et al. | 370/468 |
| 6,480,482 B1 | 11/2002 | Shoji | 370/342 |
| 6,483,355 B1 | 11/2002 | Lee et al. | 327/113 |
| 6,493,331 B1 | 12/2002 | Walton et al. | 370/341 |
| 6,549,542 B1 | 4/2003 | Dong et al. | 370/441 |
| 6,549,545 B1 | 4/2003 | Yamamoto et al. | 370/508 |
| 6,628,958 B1 | 9/2003 | Kamel et al. | 455/522 |
| 6,654,430 B1 | 11/2003 | Kim et al. | 375/346 |
| 6,711,142 B1 | 3/2004 | Suzuki et al. | 370/329 |
| 6,735,438 B1 | 5/2004 | Sabatino | 455/427 |
| 6,744,746 B1 | 6/2004 | Bartelme | 370/329 |
| 6,745,050 B1 | 6/2004 | Forsythe et al. | 455/561 |
| 6,785,323 B1 | 8/2004 | Proctor, Jr. | 375/146 |
| 6,847,407 B2 | 1/2005 | Min | 348/565 |
| 6,879,581 B1 | 4/2005 | Leung | 370/352 |
| 6,889,033 B2 * | 5/2005 | Bongfeldt | 455/11.1 |
| 6,891,575 B2 | 5/2005 | Matsuura | 348/731 |
| 6,980,644 B1 | 12/2005 | Sallaway et al. | 379/391 |
| 7,016,332 B2 | 3/2006 | Kilfoyle | 370/335 |
| 7,039,376 B2 | 5/2006 | Isoda | 455/232.1 |
| 7,039,418 B2 | 5/2006 | Amerga et al. | 455/456.1 |
| 7,050,510 B2 | 5/2006 | Foschini et al. | 375/299 |
| 7,058,028 B1 | 6/2006 | Holma et al. | 370/318 |
| 7,061,891 B1 | 6/2006 | Kilfoyle et al. | 370/335 |
| 7,248,841 B2 | 7/2007 | Agee et al. | 455/101 |
| 7,383,045 B2 | 6/2008 | Tamura et al. | 455/433 |
| 2002/0001287 A1 | 1/2002 | Bergenwall et al. | |
| 2002/0018454 A1 | 2/2002 | Misra et al. | 370/336 |
| 2002/0036997 A1 | 3/2002 | Kim et al. | |
| 2002/0041248 A1 | 4/2002 | Galton | 341/156 |
| 2002/0051433 A1 | 5/2002 | Affes et al. | 370/335 |
| 2002/0067761 A1 | 6/2002 | Kong et al. | 375/148 |
| 2002/0160804 A1 | 10/2002 | Bogner et al. | 455/522 |
| 2002/0171580 A1 | 11/2002 | Gaus et al. | 342/357.06 |
| 2003/0016640 A1 | 1/2003 | Onggosanusi et al. | 370/335 |
| 2003/0095529 A1 | 5/2003 | Petre et al. | 370/342 |
| 2003/0206577 A1 | 11/2003 | Liberti et al. | 375/152 |
| 2004/0090906 A1 | 5/2004 | Moshavi et al. | 370/208 |

FOREIGN PATENT DOCUMENTS

| | | |
|---|---|---|
| EP | 0 651 524 | 5/1995 |
| EP | 0 984 653 | 3/2000 |
| JP | 58040938 | 3/1983 |
| JP | 58090833 | 5/1983 |
| JP | 63-019925 | 1/1988 |
| JP | 64-051730 | 2/1989 |
| JP | 2000-286772 | 10/2000 |
| JP | 2001-028566 | 1/2001 |
| JP | 2002-111571 | 4/2002 |
| JP | 2002-171215 | 6/2002 |
| WO | WO 94/17605 | 8/1994 |
| WO | WO 97/13386 | 4/1997 |
| WO | WO97/42720 | 11/1997 |
| WO | WO 99/29048 | * 12/1997 |
| WO | WO 99/27747 | 6/1999 |
| WO | WO 99/29048 | 6/1999 |

OTHER PUBLICATIONS

Verdu, S., "Adaptive Multiuser Detection," *Code Division Multiple Access Communications*, S.G. Glisic and P.A. Leppanen, Eds., pp. 97-116, The Netherlands, Kluwer, 1995.

"3G TS 25.211, V. 3.4.0—Draft (Sep. 2000)—3$^{rd}$ Generation Partnership Project; Technical Specification Group Radio Access Network; Physical Channels and Mapping of Transport Channels onto Physical Channels (FDD) (Release 1999)," Copyright 2000, 46 pages.

International Search Report for Application No. PCT/US02/09566, dated Jul. 18, 2002 (mailing date).

Preliminary Examination Report for Application No. PCT/US02/09566, dated Feb. 13, 2003 (mailing date).

Supplementary European Search Report for Application No. EP 01 99 0790, dated Dec. 3, 2007 (mailing date).

International Search Report for Application No. PCT/US03/21691, dated Oct. 30, 2003 (mailing date).

Written Opinion for Application No. PCT/US01/45663, dated Nov. 18, 2002 (mailing date).

International Search Report for Application No. PCT/US01/45663, dated Apr. 18, 2002 (mailing date).

"3G TR 25.922 V. 3.1.0 (Mar. 2000)—3rd Generation Partnership Project; Technical Specification Group Radio Access Network; Radio Resource Management Strategies (Release 1999)," Copyright 2000, 59 pp.

"3G TR 25.942 V. 2.2.1 (Dec. 1999)—3rd Generation Partnership project; Technical Specification Group (TSG) RAN WG4; RF System Scenarios," Copyright 1999, 97 pp.

"3GPP TS 25.331 V. 3.5.0 (Dec. 2000)—3rd Generation Partnership Project; Technical Specification Group Radio Access Network; RRC Protocol Specification (Release 1999)," Copyright 2000, 158 pp.

3GPP; Technical Specification Group Radio Access Network; Opportunity Driven Multiple Access (3G TR 25.924 V1.0.0), Dec. 1999.

"3G TR 25.924 V. 1.0.0 (Dec. 1999)—3rd Generation Partnership Project; Technical Specification Group Radio Access Network; Opportunity Driven Multiple Access (3g TR 25,924 version 1.0.0)," Copyright 1999, 13 pp.

Lee et al., "The Impact of Repeaters on CDMA System Performance," Vodafone AirTouch Global Technology, IEEE, 2000.

Written Opinion for Application No. PCT/US03/21691, dated Sep. 7, 2004 (mailing date).

Preliminary Examination Report for Application No. PCT/US01/45663, dated Jul. 23, 2003 (mailing date).

Preliminary Examination Report for Application No. PCT/US03/21691, dated Jan. 10, 2005 (mailing date).

Notice of Allowance for U.S. Appl. No. 09/773,667, dated Oct. 6, 2005, 6 pp.

Amendment, dated Sep. 1, 2005, in response to Final Office Action dated Jun. 1, 2005 for U.S. Appl. No. 09/773,667, 8 pp.

Final Office Action dated Jun. 1, 2005 for U.S. Appl. No. 09/773,667, 14 pp.

Amendments/Response, dated Jan. 6, 2005, in response to Non-Final Office Action dated Oct. 6, 2004 for U.S. Appl. No. 09/773,667, 31 pp.

Non-Final Office Action dated Oct. 6, 2004 for U.S. Appl. No. 09/773,667, 25 pp.

Response to Non-Final Office Action dated Oct. 1, 2008 filed on Oct. 28, 2008 for U.S. Appl. No. 11/326,347, 20 pp.

Non-Final Office Action dated Oct. 1, 2008 for U.S. Appl. No. 11/326,347, 23 pp.

Notice of Allowance dated Jan. 20, 2006 for U.S. Appl. No. 09/953,157, 4 pp.

Reply dated Dec. 28, 2005 in response to Non-Final Office Action dated Sep. 28, 2005 for U.S. Appl. No. 09/953,157, 9 pp.

Final Office Action dated Sep. 28, 2005 for U.S. Appl. No. 09/953,157, 9 pp.

Response filed Jul. 21, 2005 in response to Non-Final Office Action dated Apr. 21, 2005 for U.S. Appl. No. 09/953,157, 18 pp.

Non-Final Office Action dated Apr. 21, 2005 for U.S. Appl. No. 09/953,157, 12 pp.

Response dated Oct. 28, 2008 in response to Non-Final Office Action dated Sep. 29, 2008 for U.S. Appl. No. 11/407,098, 11 pp.

Non-Final Office Action dated Sep. 29, 2008 for U.S. Appl. No. 11/407,098, 6 pp.

Notice of Allowance dated Dec. 14, 2006 for U.S. Appl. No. 10/108,569, 4 pp.

Response file Nov. 7, 2006 in response to Non-Final Office Action dated Aug. 7, 2006 for U.S. Appl. No. 10/108,569, 25 pp.

Non-Final Office Action dated Aug. 7, 2006 for U.S. Appl. No. 10/108,569, 12 pp.

Response dated Jul. 29, 2008 in response to Non-Final Office Action dated Apr. 30, 2008 for U.S. Appl. No. 11/717,743, 8 pp.

Non-Final Office Action dated Apr. 30, 2008 for U.S. Appl. No. 11/717,743, 13 pp.

Supplemental Notice of Allowability dated Sep. 13, 2005 for U.S. Appl. No. 10/259,395, 2 pp.

Notice of Allowance dated Aug. 26, 2005 for U.S. Appl. No. 10/259,395, 6 pp.

Amendment and Request for Reconsideration dated Aug. 10, 2005 in response to Final Office Action dated Jun. 10, 2005 for U.S. Appl. No. 10/259,395, 6 pp.

Final Office Action dated Jun. 10, 2005 for U.S. Appl. No. 10/259,395, 9 pp.

Response dated Dec. 13, 2004 in response to Non-Final Office Action dated Aug. 12, 2004 for U.S. Appl. No. 10/259,395, 14 pp.

Non-Final Office Action dated Aug. 12, 2004 for U.S. Appl. No. 10/259,395, 8 pp.

Response dated May 17, 2004 to Restriction Requirement dated Apr. 16, 2004 for U.S. Appl. No. 10/259,395, 3 pp.

Office Action (Restriction Requirement) dated Apr. 16, 2004 for U.S. Appl. No. 10/259,395, 5 pp.

Response dated Jan. 2, 2004 in response to Non-Final Office Action dated Oct. 2, 2003 for U.S. Appl. No. 10/259,395, 6 pp.

Non-Final Office Action dated Oct. 2, 2003 for U.S. Appl. No. 10/259,395, 20 pp.

Supplementary European Search Report for Application No. EP 03 79 9246, dated Oct. 4, 2006.

Non-Final Office Action dated Nov. 24, 2008 for U.S. Appl. No. 11/287,226, 10 pp.

Non-Final Office Action dated Nov. 14, 2008 for U.S. Appl. No. 11/287,321, 11 pp.

Non-Final Office Action dated Nov. 18, 2008 for U.S. Appl. No. 11/717,743, 9 pp.

Examiner's Interview Summary dated Nov. 10, 2008 for U.S. Appl. No. 11/326,347, 2 pp.

* cited by examiner

METHOD AND SYSTEM FOR A CHANNEL SELECTIVE REPEATER WITH CAPACITY ENHANCEMENT IN A SPREAD-SPECTRUM WIRELESS NETWORK

This application is a divisional application of and claims priority to and incorporates by reference in its entirety, application Ser. No. 10/259,395, now U.S. Pat. No. 7,006,461 entitled, "METHOD AND SYSTEM FOR A CHANNEL SELECTIVE REPEATER WITH CAPACITY ENHANCEMENT IN A SPREAD-SPECTRUM WIRELESS NETWORK," filed Sep. 30, 2002, which application is a continuation in part of, and incorporates by reference in its entirety, U.S. patent application Ser. No. 09/953,157, now U.S. Pat. No. 7,061,891 entitled, "METHOD AND SYSTEM FOR A REMOTE DOWNLINK TRANSMITTER FOR INCREASING THE CAPACITY AND DOWNLINK CAPABILITY OF A MULTIPLE ACCESS INTERFERENCE LIMITED SPREAD-SPECTRUM WIRELESS NETWORK," filed Sep. 17, 2001, and herein referred to as the parent application.

BACKGROUND OF THE INVENTION

1. Field of the Invention

The present invention relates generally to wireless networks and communication systems. More particularly, the preferred embodiments of the present invention relate to methods and systems for providing intelligent repeaters in spread spectrum communication systems to support selective amplification of communication channels and signals therein.

2. Description of the Related Art

The field of spread spectrum, wireless communication has been active for over a decade. For instance, the advantages of an exemplary code division multiple access (CDMA) system are described in U.S. Pat. No. 4,901,307 issued Feb. 13, 1990 to K. Gilhousen et al. While many factors dictate the capacity of a spread-spectrum wireless network, received signal power and noise power at the network nodes are important factors in considering network capacity. Most conventional strategies for increasing network capacity may be viewed as a means: 1) to increase signal power; 2) to decrease interference; or 3) to instill tolerance for lower signal to interference plus noise ratios (SINR). In this context, to extend network coverage in rural areas or into obstructed or shadowed areas, conventional repeaters have classically been used as a means to increase received signal power and reduce transmitted power requirements for originating nodes. As understood in the art, repeaters are devices that amplify or regenerate signals in order to extend the transmission distance. As network usage continues to grow, however, particularly in dense urban subscriber areas, excessive multiple access interference (MAI) is becoming a primary limitation to network capacity. This network state is known as reaching pole capacity. Conventional repeaters amplify all received signals and, as such, do little to improve the signal to interference power ratio. Consequently, conventional repeaters are generally ineffective for increasing the pole capacity. As understood in the art, MAI is a significant noise source limiting the practical capacity and performance of second generation, spread-spectrum based wireless services, such as one based on CDMA digital transmission. A number of techniques employing the aforementioned strategies for increasing network capacity have been proposed for compensating the MAI associated with spread spectrum wireless systems.

The foremost conventional technique for compensating MAI and ensuring reliable communication is to control the transmitted power from both the mobile station and the base station (BS). Several examples of this technique are described in U.S. Pat. Nos. 6,119,010, 6,118,983, and 6,104,933. A second technique relies on controlling the patterns of the receiving and transmitting antennas. By dividing the service area into independent sectors or adaptively nulling interferers (so-called "space time adaptive processing"), MAI from other users that are directionally resolvable may be substantially reduced. U.S. Pat. Nos. 6,101,399, 6,078,823, and 5,953,325 are examples of this technique. Yet another technique utilizes complex, non-linear algorithms in the receiver to concurrently estimate the signals from a multitude of users, as shown in U.S. Pat. Nos. 6,081,516, 6,014,373, and 5,956,333. Termed multi-user detection (MUD), such approaches require extensive computational resources at the receiver and, as such, are suitable for use on the uplink (at the BS) but not on the downlink (at the mobile).

As mentioned earlier, the use of repeaters also has been introduced in the field of spread spectrum, wireless communication. Conventional repeaters appear to fall into one of two categories: channel conversion and multipath simulation. A channel-conversion repeater takes the signals received at the repeater and converts them to an alternate radio resource, such as another frequency band or another channelization code. The industry standard organization for next generation, i.e. third generation (3G), CDMA systems has included one implementation of such a repeater in its standard. Termed Opportunity Driven Multiple Access (ODMA), that configuration is discussed in the Third Generation Partnership Project (3GPP) Technical Report 25.924 version 1.0.0. A number of patents, such as U.S. Pat. Nos. 5,887,261 and 6,141,533, also relate to the use of repeaters. Specifically, U.S. Pat. No. 5,887,261 describes a non-selective channel converting repeater, and U.S. Pat. No. 6,141,533 describes a repeater design that converts and relays selected traffic and control channels. This selective design may be viewed as having nearly the functionality of a BS except that the link to the network infrastructure is carried on typical network voice and traffic channels back to an actual BS. In contrast, a multipath simulating repeater generally takes the entire received RF signal, introduces a delay on the order of several microseconds, and re-transmits the signal. The intent is to preserve any signal diversity as seen by the repeater in a manner that the link termination may exploit with a RAKE receiver. U.S. Pat. Nos. 5,930,293, 5,652,765, 5,991,345, and 6,035,218 are examples.

Additionally, U.S. Pat. Nos. 5,835,848, 5,812,933, and 6,108,364 focus on the necessity for substantive isolation between the transmit and receive subsystems for repeaters that do not provide frequency conversion. Finally, there are patents, such as U.S. Pat. Nos. 5,936,754, 5,867,485, and 5,809,422, that propose remote emitters linked to the BS via means other than an in-band radio frequency (RF) transmission to support both the uplink and downlink.

BRIEF SUMMARY OF THE INVENTION

The potentially large computational capabilities of the BS allow sophisticated signal processing algorithms (e.g., floating point calculations, complex demodulation algorithms, and multiple antenna streams) to be employed to increase capacity in the reception of mobile-to-base-station signals (uplink or reverse link) and mitigation of MAI in a spread-spectrum, wireless network. However, the base-station-to-mobile link (downlink or forward link) is limited by the mobile hardware such as the mobile cellular telephone, which is typically quite unsophisticated in comparison to the BS. Thus, the absence of such large computational capabilities at the mobile subscriber introduces a network imbalance that hinders optimizing system performance and balancing system capacity.

Conventional repeaters and remote emitters of the types mentioned earlier have been used to address the aforementioned network imbalance in MAI mitigation. Conventional repeaters typically increase the radiated power of not only specific users but also all in-band signals. However, the network capacity limitation, i.e., the network state of reaching pole capacity, is unique in that increased signal power to overcome the interference of new users does little good. As transmitted power is increased for all users in an attempt to increase signal power, MAI levels rise nearly a proportionate amount resulting in, still, inadequate SINR values. In these circumstances, conventional repeaters are ineffective as they indiscriminately amplify all in-band energy, including interference such as the now all-important MAI, particularly on the downlink.

As a result, while most conventional repeaters can be quite effective at increasing both coverage and capacity for wireless networks with sparse distant and shadowed users, they are not so effective in the dense, urban wireless communication networks of today where MAI often dominates over receiver noise for most users. Thus, conventional urban repeaters only offer increased coverage but not substantially increased capacity of a network cell, which is the basic geographic unit of the cellular structure often employed in wireless networks. It is the non-selective nature of these conventional repeaters that distinguishes them from the present invention.

Some conventional channel converting repeaters, such as those mentioned earlier, are indeed selective in what they repeat. However, by converting channels, these repeaters consume additional network radio resources, must be accounted for in overall network planning, and thereby add complexity to their network integration. Additionally, the selectivity function of these repeaters is accomplished by essentially mimicking the access, paging, and handoff behavior of a BS. This approach adds great complexity to the hardware and software requirements of such repeaters. It is the complexity of integrating these repeaters into the overall wireless network infrastructure that distinguishes them from the present invention.

Likewise, the aforementioned conventional remote emitters must support both communication downlink and uplink in order to only extend the coverage area, wherein support of the uplink involves substantially more complexity and cost than support of the downlink. Consequently, there exists a need to economically increase the call capacity and coverage area of spread spectrum, wireless networks that serve dense wireless communication areas. The parent application shows the use of a dual scale cellular architecture employing remote downlink transmitters (RDTs) wherein the uplink is fashioned around a macrocellular system while the downlink is fashioned around a microcellular system. The use of the RDTs and related functionality were shown to provide a cost effective solution for several-fold increases in practical downlink capacity that efficiently complemented the range of solutions for increasing uplink capacity. The parent application also shows the application of RDT technology to enable wireless service providers to offer a high-speed data download capability on the network downlink while having negligible impact on any existing capacity and requiring little modification to the uplink physical layer.

Accordingly, the preferred embodiments of the present invention further disclose a repeater technology that can increase the signal to interference plus noise ratio (SINR) of users in a wireless, spread-spectrum network without lowering the SINR of other users and thus has the potential to increase overall network capacity.

The preferred embodiments of the present invention also provide a method and system for a channel selective repeater (CSR) that is capable of repeating only signals in desired channels, thereby suppressing undesirable interference, and consequently increasing network capacity. The CSR represents an extension of the RDT technology by incorporating intelligent repeater capability and other advanced features while preserving a key feature of the RDT architecture, namely the low cost and minimal impact associated with integrating the CSR into an existing network infrastructure.

The preferred embodiments of the present invention also provide an adaptive, closed-loop logic for providing traffic-channel specific amplification power control to further increase network capacity, wherein the control logic is driven by the SINR of the communication link between the BS and the CSR rather than any information reported by the mobile equipment.

The preferred embodiments of the present invention also provide a method and system for a low-cost intelligent signal repeater that introduces minimal impact associated with integrating the repeater into an existing wireless communication network infrastructure; wherein no physical connection of the repeater to the network is required, and there is little or no change to the existing network layer topology or control structure.

The preferred embodiments of the present invention also provide a method and system for a wireless communication network that integrates intelligent repeaters to only amplify and repeat selected traffic and control channels of the network in order to increase the capacity and coverage of the network. Each repeater is capable of one or more of the following tasks: 1) performing passive observation and capturing of links from existing BS downlinks of the network; 2) constructing the signal to be transmitted from its digital representation to avoid emitting unnecessary interference and noise; 3) representing the transmitted signal to the network users as simply a new multipath component of the BS signal to avoid the requirement for any dedicated control capability, new network radio resources, or complex network management algorithms; and 4) incorporating a dual-mode architecture with distinct, modular solutions for the uplink and the downlink paths.

The preferred embodiments of the present invention also provide a method and system for a signal repeater that automatically repeats any combination of traffic channels it receives on either the uplink or downlink, and it includes an analog mode that will repeat all in-band radio frequency signals.

The preferred embodiments of the present invention also provide a method and system for minimizing the required transmit power of downlink communication channels selected for repetition by a repeater by restoring nearly perfect channelization code orthogonality and reducing out-of-cell interference power at the repeater receiver.

The preferred embodiments of the present invention additionally provide a method and system for maintaining the carrier phase reference of a signal repeater within the frequency tolerance for the network as specified by the appropriate standard.

The preferred embodiments of the present invention also provide a method and system for a wireless communication network augmented with at least one intelligent repeater to: 1) accept multipath delays to the extent that the repeaters can perform signal reception, demodulation, channel selection, and reconstruction of downlinks; 2) implement an algorithm developed to enable each repeater to autonomously and reliably determine which downlink channels are best served by the repeater; 3) provide extensive isolation protection between the receiver subsystem and the transmitter subsystem of the repeater; 4) match the frequency reference of the repeater to the BS to a tolerance acceptable to the network; 5) optimize the repeater gain for each downlink traffic channel to increase capacity of the network; and/or 6) incorporate design features that enable a low-power link between the BS and the repeater for channels being repeated by the repeater to further increase capacity.

Additional aspects and novel features of the invention will be set forth in part in the description that follows, and in part will become more apparent to those skilled in the art upon examination of the disclosure.

BRIEF DESCRIPTION OF THE DRAWINGS

The preferred embodiments are illustrated by way of example and not limited in the following figures, in which.

DETAILED DESCRIPTION OF THE INVENTION

Figure 1A:
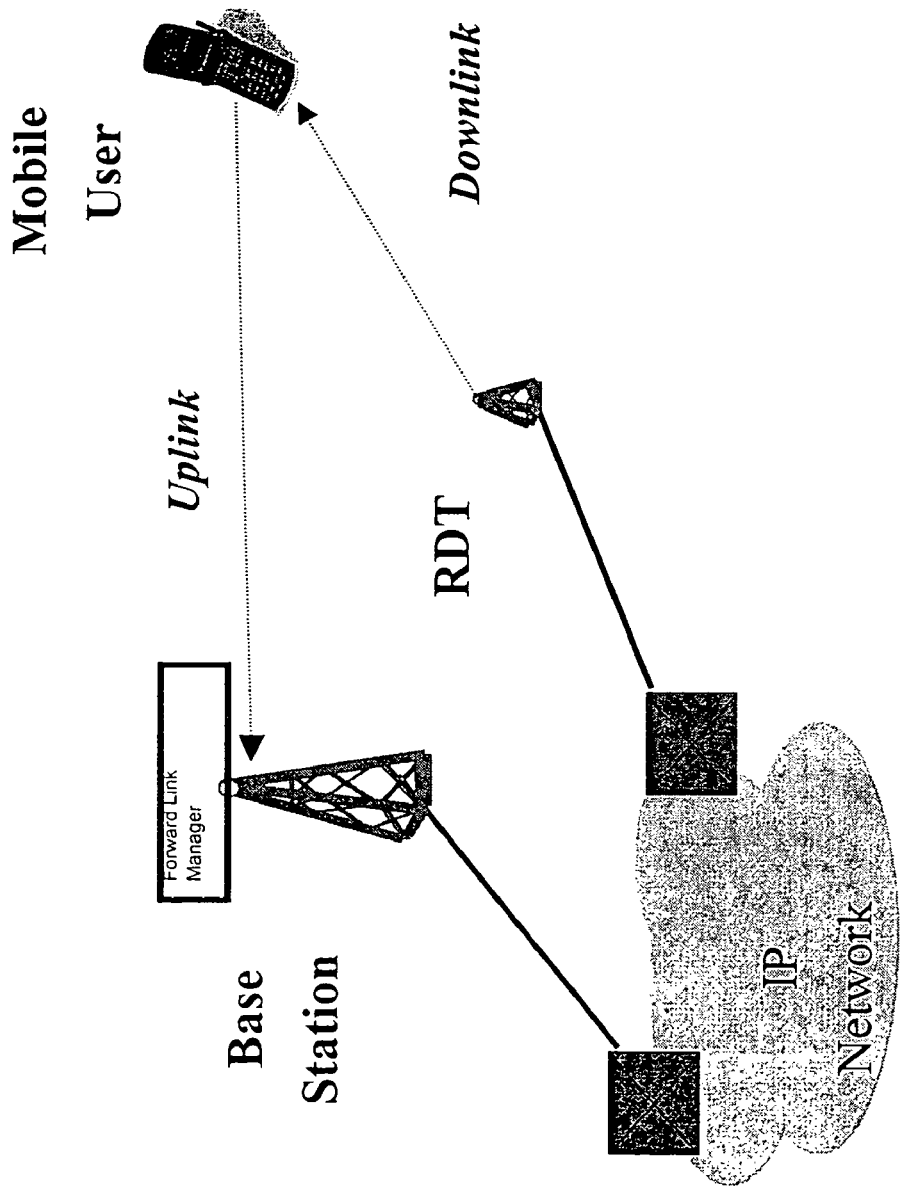
FIG. 1A shows an RDT-equipped network architecture in accordance to the disclosures in the parent application.
Figure 1B:
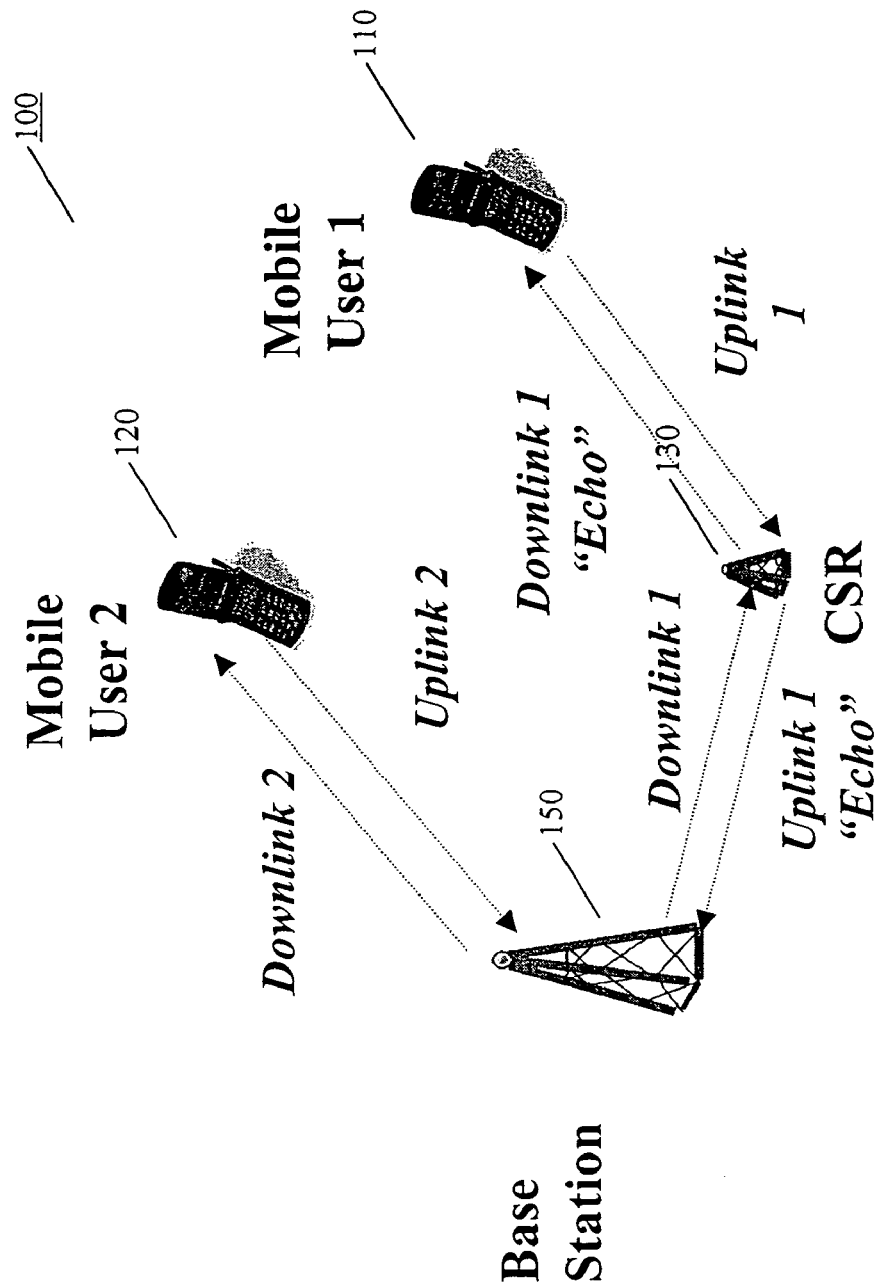
FIG. 1B shows the baseline architecture of a CSR-equipped network in accordance with an embodiment of the present invention.

Reference is now made in detail to an embodiment of the present invention, an illustrative example of which is illustrated in the accompanying illustrations, showing methods and systems for an intelligent channel-selective repeater (CSR) capable of amplifying selected communication channels to provide capacity enhancement in dense, urban spread-spectrum (e.g., CDMA) wireless networks. It should be noted that selected channel amplification discussed herein refers to the amplification of signals in a selected channel. For reference, the network architecture with an RDT deployment as disclosed in the parent application is shown in FIG. 1A. As mentioned in the parent application, the BS in a RDT-equipped network continues to serve the uplink of the mobile user while the RDT serves the downlink. The RDT, in turn, receives the downlink traffic for selected channels from the BS using a source different from what the CSR of the present invention would use to serve the mobile user. The RDT-equipped network determines which users are best served by an RDT and that decision is leveraged by the Forward Link Manager to control the RDT. The same network of FIG. 1A wherein a CSR is used in place of the RDT is depicted in FIG. 1B, which shows a one-cell, baseline architecture 100 of a CSR-equipped wireless network in accordance with an embodiment of the present invention. It should be understood that a wireless network incorporating the present invention may include one or more of such cell having the architecture 100. The basic operation of the cell 100 is as follows. Mobile user 1 with a user equipment (UE) 110 (e.g., a mobile phone or any other device capable of wireless communication), is located such that he/she is favorably served by a CSR 130 located in the cell 100, which selects the mobile user 1 and echoes the traffic channels of his/her UE 110. Mobile user 2 with a UE 120, such as another mobile phone, is located such that he/she is best served by the BS 150. Even though the CSR 130 can receive links from the UE 120 of the mobile user 2, those links are not repeated by the CSR 130.

According to an embodiment of the present invention, the CSR 130 can selectively amplify signals in selected traffic channels by demodulating and decoding signals in those individual channels and then multiplexing and re-modulating such signals in the selected channels. Thus, the CSR 130 can receive links to and from both UEs 110 and 120 but only echoes or repeats links to and from UE 110. The logic for channel selection by the CSR will be described later. The underlying paradigm of the present invention is to make the CSR signal appear as a high power, multipath component of the BS. By doing so, the existing multipath exploitation algorithms in the CSR-equipped network can seamlessly transition users between CSR signals and BS signals.

Figure 2:
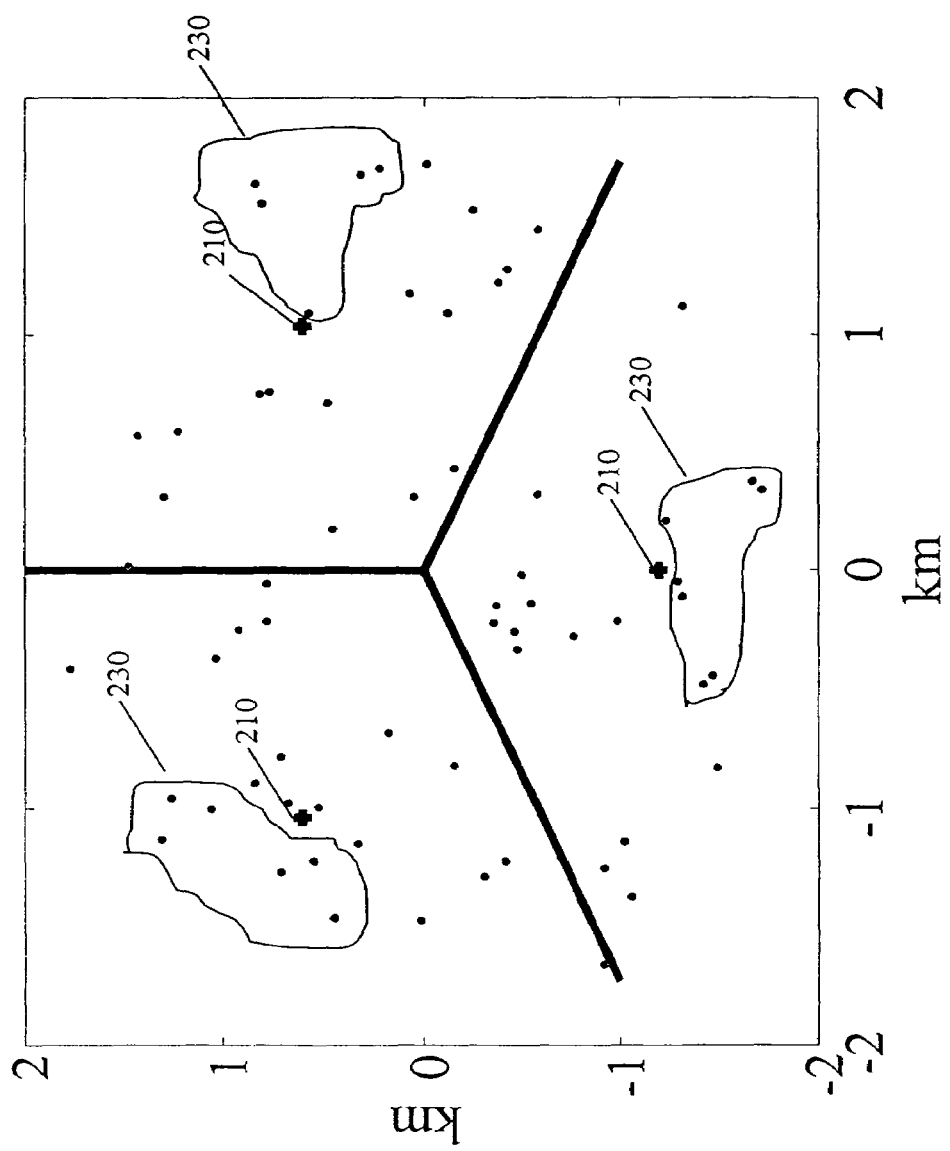
FIG. 2 shows a typical single-cell realization of the network model for simulation in accordance with an embodiment of the present invention.

To confirm the capacity enhancement of a CSR-equipped network, a detailed, high-fidelity network model was developed and used to estimate the capacity of: 1) a baseline IS-95B compliant urban network; 2) a baseline network augmented with conventional analog repeaters; and 3) a baseline network augmented with CSRs of the present invention. As understood in the art, IS-95B is a digital CDMA standard in the wireless communication industry. The aforementioned simulation is based on a 37-cell network with 3 sectors per cell and a 2-km cell radius. Physical layer parameters and power constraints consistent with realistic networks were used. The repeaters (conventional analog repeaters and CSRs) were placed midway between the cell center and cell boundary. An example of a single-cell, sector realization of the network model with BS and repeater placement is shown in FIG. 2, in accordance with an embodiment of the present invention. The BS is located in the center, at the mutual endpoint of the three black lines, which demark sector boundaries of the cell. The repeater in each sector is shown as a big dot 210. Dots enclosed by circular boundaries 230 represent network subscribers (i.e., mobile users) served by the repeaters, and dots outside of the circular boundaries 230 represent network subscribers served by the central BS. The resulting capacities are detailed in Table 1, which shows the results of the high-fidelity network model analysis in terms of the maximum kbps/cell sustained by the various configurations in an IS-95B network. The maximum loading is defined as that in which no more than 5% of the users (and, thus, their UEs) are denied service.

TABLE 1

| Configuration | Downlink Capacity (full rate voice users/cell) | Uplink Capacity (full rate voice users/cell) |
| --- | --- | --- |
| No Repeaters | 16 | 16 |
| Analog Repeaters | 16 | 21 |
| Channel Selective Repeater | 22 | 23 |

Figure 3:
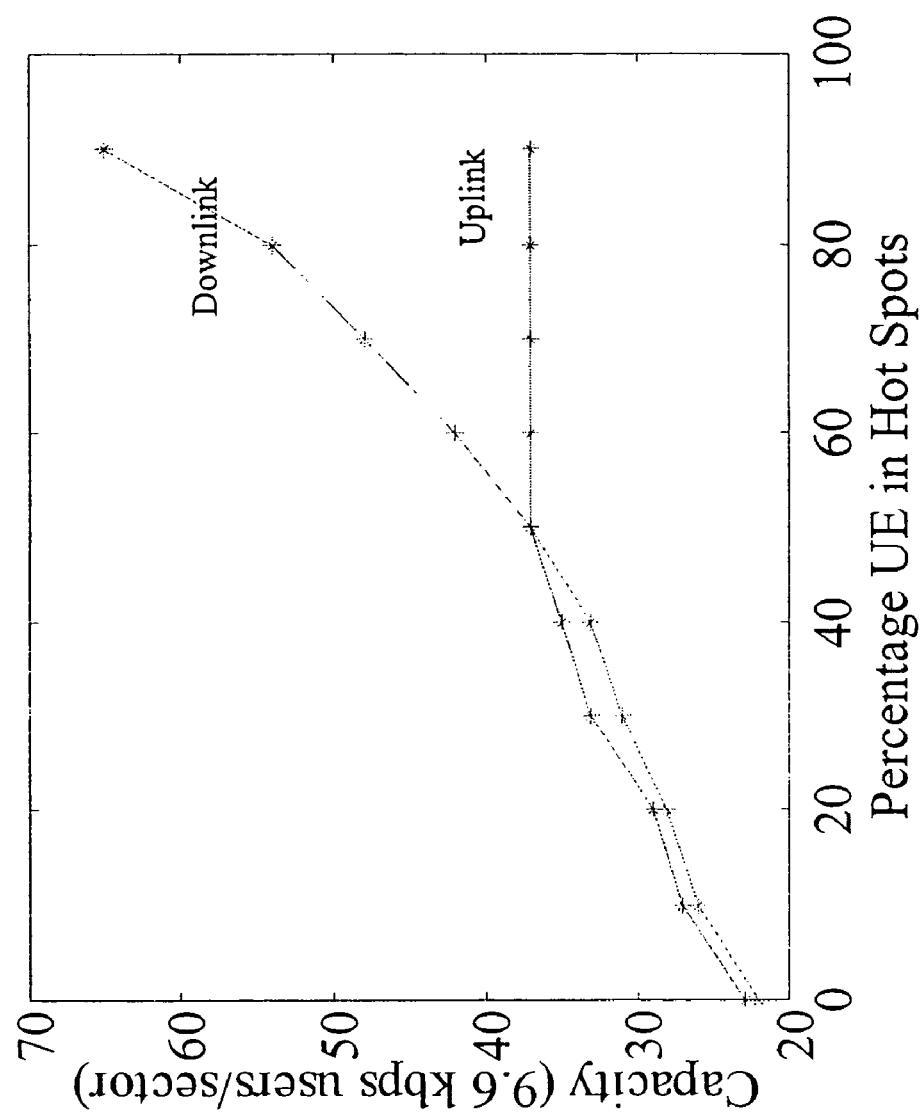
FIG. 3 shows the capacity enhancement in a CSR-equipped wireless communication network in accordance with an embodiment of the present invention.

As mentioned earlier, because a conventional downlink repeater not only amplifies signals of traffic channels for users beyond the repeater but for all users, it increases interference levels unnecessarily in the outer cell regions. This fact is a key explanation for the inability of a conventional repeater to significantly increase capacity over dense, urban downlinks. Additional analysis has shown little sensitivity of capacity in kbps/cell to the particular quality of service mix, i.e., voice versus data links. Furthermore, when the increased network load is concentrated geographically, the capacity enhancement of the CSR can exceed 100% for the uplink and downlink paths, as shown in FIG. 3. In other words, if the additional network loading is concentrated geographically into "hot spots" rather than distributed uniformly over a network cell, the advantage of a CSR in the cell in terms of capacity improvement rises significantly.

The technique employed by the CSR of the present invention to selectively amplify signals in certain traffic channels introduces a latency between the input and output of the CSR. This is because the CSR is tasked with performing, within a given time constraint, the following functions: 1) receive the 64 consecutive chips (i.e., bits used in the spreading signal which are modulated by a single data bit) of the Walsh codes in the received signal; 2) remove the short Pseudo-random Noise (PN) code or sequence scrambling in each received signal; 3) coherently demodulate the bits carried by each code channel; 4) select code channels for amplification and apply a channel specific gain factor; 5) sum the selected code channels; 6) scramble with the appropriate short PN sequence; and 7) re-modulate onto a downlink carrier. This may require 50 μsec (the time required to receive an entire Walsh code). Calculations have indicated that a field programmable gate array (FPGA) design can perform the subsequent processing in above steps 2 to 7 in less than 30 μsec for a total delay of less than 80 μsec. According to one embodiment of the present invention, the latency requirement for the integration of the CSR into a wireless network can be accommodated through modification of a single network software parameter, SRCH_WIN_A, in the IS-95B specification.

Figure 4:
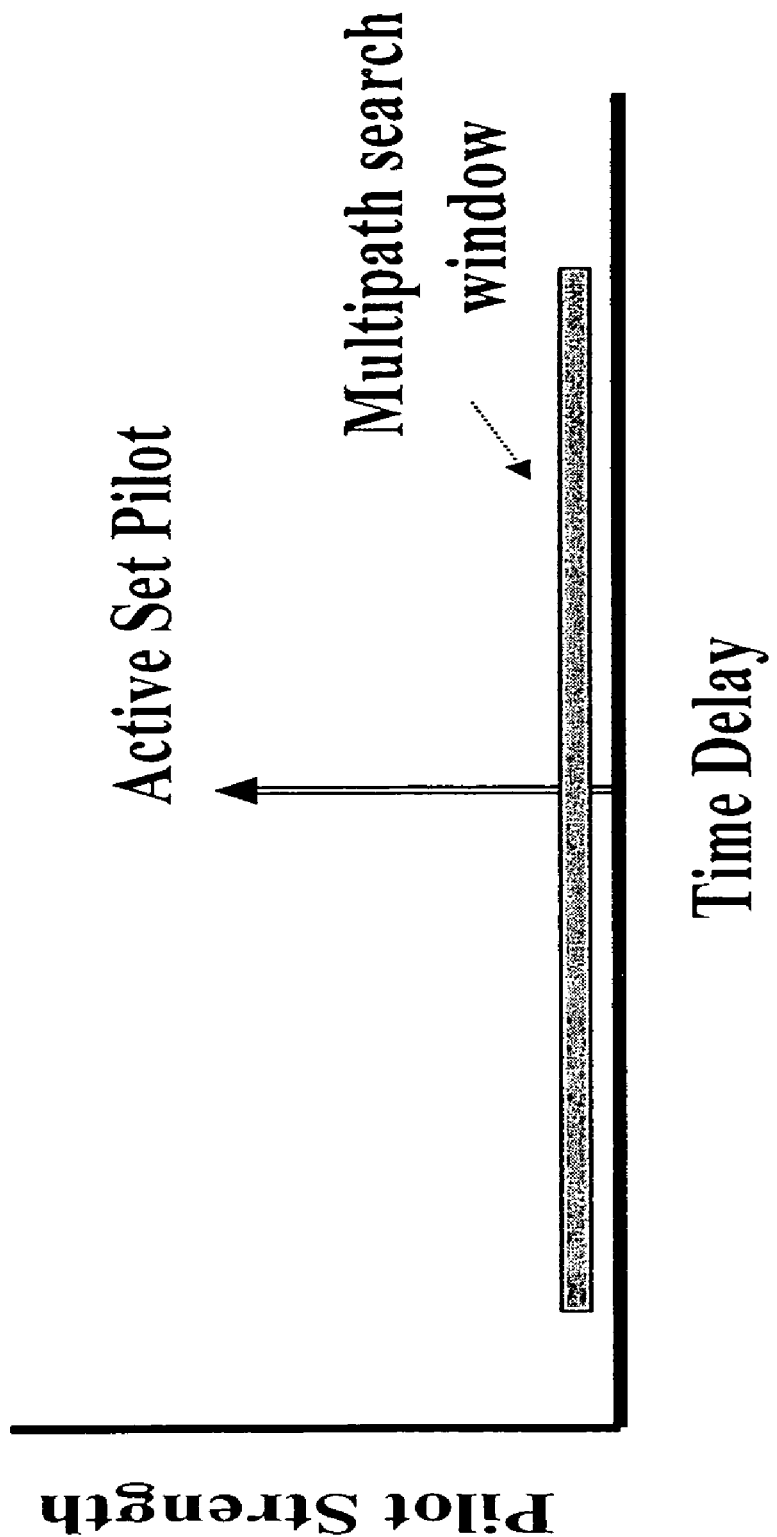
FIG. 4 shows the multipath search window graph with time delay and pilot strength in accordance with an embodiment of the present invention.

If the UE is to appropriately process the repeated signal from the CSR, it must first be able to identify the signal as a suitable signal replica (i.e., a multipath component of a BS signal); secondly, it must be able to coherently combine such signal with signals received either from the BS in the primary cell or those BS's from cells that are in soft handoff with the UE. As understood in the art, soft handoff refers to a switching of cellular transmission from one sector to another (i.e., from one transmitter to another) and typically requires the UE to concurrently receive and combine signals from multiple BS's. Thus, it must be shown that the 80 μsec (~100 chips) delay by the CSR does not preclude the repeated signal from being used in the UE Rake receiver. As understood in the art, UEs such as cellular phones employ Rake receivers to process multipath components of signals generated from the BS. Likewise, each BS may also employs a Rake receiver to process multipath components of signals generated from UEs. The IS-95B specification requires each UE to maintain a separate processing element that is tasked with searching for pilot signals and identifying those of suitable strength for use in processing by a Rake receiver (section 6.2.2.1 in ANSI/TIA/EIA-95-B-1999). Thus, in order to ensure that this searcher detects the CSR pilot signal (i.e., pilot bits from the CSR pilot channel), it is desired to set the parameter SRCH_WIN_A in the network to a value of 13 (per Table 6.6.6.2.1-1 in ANSI/TIA/EIA-95-B-1999). This will force each UE to search over a window of ±113 chips around any identified pilot channel for associated multipath components. Although larger search windows are possible, the IS-95B specification does not require the UE to implement any higher values. Whether the UE initially synchronizes to the CSR pilot channel or the BS pilot channel, the UE searcher will continually evaluate both as candidates for inclusion in the UE Rake receiver. The IS-95B specification further specifies that each UE support at least three independent processing elements (Rake correlators or fingers) capable of demodulating downlink traffic channels. It is assumed that each element uses the associated Rake finger pilot to perform this function. As such, whether the Rake finger processes signals from the central BS, the CSR, or another BS on soft handoff, it makes no material difference to the UE Rake receiver. The search window with important quantities highlighted is shown schematically in FIG. 4. For each of the pilot signals included in the active set, the processing element dedicated to the searching function scans over a delay space centered on the active set pilot and of width specified by the network parameter SRCH_WIN_A. The maximum value that all UEs must accommodate is set at ±113 chips as mentioned earlier.

Having determined that the UE will, in fact, detect the delayed, repeated signal, it must be assured that the UE Rake receiver is capable of combining signals delayed to this extent. Section 6.6.6.2.7.1 in the IS-95B specification specifies the UE to accommodate diversity combining of channels with as much as 150 μsec (192 chips) delay. As such, the requirement that the repeated signal be delayed no more than 88 μsec (113 chips) is sufficient to ensure it can be reliably processed by the Rake receiver. To summarize, setting the network parameter SRCH_WIN_A to a value of 13 will suffice to accommodate the latency needs of the CSR design. Consequently, by reconfiguring the network parameter and controlling latency, the CSR becomes a virtual "plug-and-play" network addition, enabling network operators to rapidly and easily meet emerging capacity requirements.

According to another embodiment of the present invention, the technique and design of the CSR recognize that the requirements and operating conditions of the network uplink and downlink may differ and thus allows dual mode operation with differing channel selection strategies on the uplink and downlink. By invoking a modular design template, CSR cost and performance may be optimized for a given network. As an example of the value of a dual-mode design, consider the simulation results of Table 1. While the selectivity of the CSR afforded it significant downlink gains over a conventional repeater, the marginal advantage of selectivity on the uplink was small. In such case, a dual mode design may be desired with an analog repeat mode used for the uplink. In this case, conventional analog repeater components can be employed in the CSR for handling the uplink path and channel selective components of the present invention can be employed in the same CSR for handling the downlink path. However, when implementation constraints may limit the ability to achieve high back lobe rejection for the uplink receiver at the repeater, channel selectivity also may be applied to the uplink in order to avoid amplifying and transmitting UE links (and thus increasing the MAI levels in the network and decreasing capacity accordingly) that are well served by the BS. In this case, channel selective components of the present invention can be employed in the CSR to handle both the uplink and downlink paths. For uplink channel selection, an additional processing module may be employed to support demodulation of the uplink signals. Specifically, the specific long code used for scrambling the UE uplink signal must be provided. The specific user long code mask (unique to each UE) used to generate the scrambling code may be made available to the CSR. Methods exists for obtaining that information and are known to those skilled in the art. Hence, the flexibility of independent designs for the uplink and downlink markedly sets it apart from the conventional repeaters.

According to still another embodiment of the present invention, there are two principal mechanisms whereby a CSR reduces the MAI levels in a cell. The first mechanism, intelligent repetition of only appropriate signals, has been discussed earlier. The second mechanism concerns the link between the BS and the CSR for those subscribers supported by the CSR repeated signal. Any strategies that enable the transmit power allocated to this link to be reduced without impairing the ability of the CSR to receive and decode the link will result in lower MAI levels throughout the network. The signal level transmitted by the CSR is defined by the CSR gain and the received signal strength at the CSR. The CSR may compensate for lower transmitted power from the BS with higher gain as long as the CSR remains able to demodulate the channels to support the selectivity function. Thus, the use of a high gain antenna at the CSR to receive signals from the BS is effective in combating the effect of thermal noise and out-of-sector MAI on CSR decoding performance which, in turn, allows the BS to "turn down" or lower the power on the links repeated by the CSR. This may be implemented in the CSR adaptive power control logic as will be further described later.

The use of a digital equalization filter prior to channel decoding in the CSR can also significantly reduce the effects of in-sector MAI and enhance the benefits of the CSR. Each downlink channel in a cell sector is assigned an ideally orthogonal channelization code. The existence of multipaths in the communication channel between the BS and the CSR, however, degrades the orthogonality of these codes and, thereby, raises the level of interference they impose on each other in a correlating receiver output. By incorporating an adaptive, digital equalization filter in the CSR, the original code orthogonality can be restored, enabling lower transmit power levels from the BS. It should be noted that in the limiting case where the link between the BS and the CSR adds no interference to the network, the CSR essentially acts as a Remote Downlink Transmitter (RDT) as disclosed in the parent application. There are numerous techniques well known in the art for implementing the digital equalization filter by calculating an appropriate linear tap-delay filter to remove the effects of channel dispersion. For instance, adaptive techniques such as stochastic gradient based algorithm (LMS) and Kalman filter based techniques (recursive least squares) can be used for creating the digital equalization filter in the CSR.

In spread-spectrum, wireless networks such as wireless CDMA networks that use soft-handoff protocols and/or Rake receivers, it is important that the carrier frequency used to construct any downlink signal that will be coherently combined in the mobile or subscriber unit to match with other carrier frequencies for other downlink signals to a high tolerance. In order to coherently combine the downlink signals, the subscriber must continually track the phase of the pilot channels associated with each downlink channel. This track rate is set to accommodate the effects of subscriber mobility. Carrier frequency offsets greater than about one part in $10^8$ would result in RAKE performance degradation due to poor phase reference estimates in the subscriber unit (i.e., UE) as it may be unable to track carrier phase changes rapidly enough. Unfortunately, frequency references that meet this tolerance are costly. An alternate method for meeting this requirement has the potential to significantly reduce the cost of any repeater that relies on an internal frequency reference. According to an embodiment of the present invention, by recognizing that a repeater will always have the benefit of exposure to the BS pilot signal, a novel, inexpensive means to compensate for relaxed tolerance of the repeater frequency reference is realizable. Specifically, a phase-locked loop (PLL) driven by the relatively high power BS pilot channel signal is readily able to compensate for the frequency drift rates of a low cost frequency reference with tolerances that are acceptable to the UEs (e.g., tolerances relaxed from one to several orders of magnitude below one part in $10^8$). Such a digital or analog PLL can be devised and implemented by one skilled in the art as based on the disclosure of the present invention.

Figure 5:
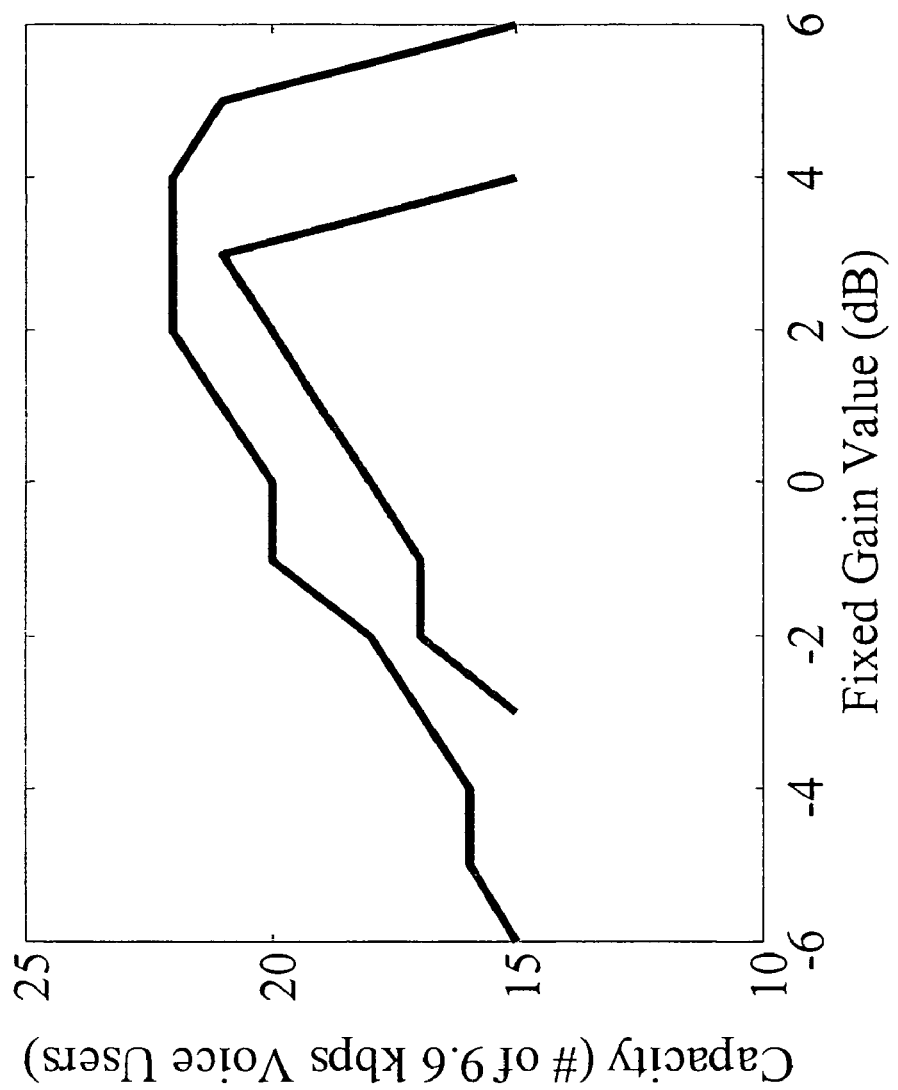
FIG. 5 shows a graph of the expected capacity of a CSR-enhanced IS-95B network's uplink and downlink computed as a function of a fixed gain factor in accordance with an embodiment of the present invention.

The CSR channel selective logic is now described in accordance with various embodiments of the present invention. One preferred CSR design entails a fixed gain factor working in concert with an outer logic loop to determine which channels should be selected for repetition. For example, a localization algorithm may be implemented that identifies which UEs are in soft-handoff with an adjacent cell. Concluding that these UEs are in the outer cell coverage area can lead to their selection as well as the exclusion of UEs not in soft handoff. This algorithm can be devised by one skilled in the art based on the following two criteria of the present invention: 1) defining a fixed gain factor/value for the selected channels; and 2) identifying and selecting those UEs that are in soft handoff in the network (e.g., those UEs at edges of cells) and applying the fixed gain factor to the selected channels for those UEs while applying a zero gain to those channels of non-selected UEs. Analysis was done to show that a fixed gain CSR, wherein all repeated channels are amplified by the same fixed gain factor, may be sensitive to the precise choice of that gain factor value, as shown in FIG. 5. The figure shows the computation of the expected capacity of a CSR-enhanced IS-95B network as a function of a fixed gain factor for both the uplink (upper black curve) and downlink (lower red curve) in a high fidelity network model. As shown in the figure, while it is possible to approach the performance of a variable gain system (near 22 users per sector), the system remains sensitive to the precise setting of the gain value.

In some instances, when the fixed, predetermined gain factor is too low, the network power control algorithm may drive the BTS-to-CSR links (i.e., the selected downlink channels received at the CSR) to an unnecessarily high SINR and waste valuable network resources. In other instances, when the fixed, predetermined gain factor is too high, the network power control algorithm may drive the BTS to CSR link to an inadequate SINR to support reliable demodulation. Hence, another embodiment of the present invention can address the aforementioned instances by supporting a variable gain factor for each selected channel. In this embodiment, the CSR has the capability to measure the SINR of the received BTS-to-CSR link and compute an appropriate individual fixed gain factor for each link. Specifically, the predetermined gain factor may be initially adjusted once on an individual basis to account for the difference between the received SINR value and a predetermined target value for each link. In another embodiment of the present invention, the selection procedure and the link gain control are combined into a single adaptive process that accomplishes both task. A novel, blind adaptive logic for such process is now described which simultaneously performs the channel selection function and sets an appropriate gain factor for each channel.

According to an embodiment of the present invention, there is provided an adaptive power control logic executing entirely within the CSR that acts to manage the received and transmitted CSR power. The logic can be software implemented so that links that are not appropriately supported by the CSR will have their gain driven to a minimum value (potentially zero and, therefore, unselected) while links that should be supported by the CSR will be "captured" and selected. The presumption here is that downlink traffic channels are initially established between the central BS and the UE over an appropriate repeated paging channel. If the CSR detects a new downlink traffic channel and the received SINR meets an initial threshold, the channel is selected and repeated. If the initial SINR threshold is not met, the channel is not repeated. Once a channel is selected, the CSR repeater gain is used to drive the received SINR at the CSR to a predetermined Eb/No or Eb/Io (energy per bit per interference plus noise energy) goal (e.g. 10 dB) by manipulating the network closed loop power control logic. The CSR logic possesses several states and rules, including the following:

1. If the channel is selected but the received SINR at the CSR is below the Eb/Io goal, the CSR gain for that downlink channel is reduced by a predetermined increment.
   a. If the CSR signal is dominating the UE received power, this gain reduction will result in the network closed loop power control raising the downlink power at the BS to thereby increase the received SINR at the CSR up to the Eb/Io goal and restoring the required Eb/Io at the UE under the lower CSR gain condition.
   b. However, if the CSR signal is not dominating the Rake receiver output at the UE, the gain reduction will not result in an improved BS to CSR link. The CSR will continue to lower the gain until the gain reaches a preset minimum level. At this point, the channel is effectively "deselected" for repetition as the network failed to respond to the CSR's attempts to repeat the signal, In this manner, although a downlink channel may be initially repeated by the CSR, if the UE is more appropriately served by the central BS, its signal will eventually be dropped by the CSR.
2. If the received SINR at the CSR is greater than the predetermined Eb/Io goal, the CSR gain for that downlink channel is increased by a predetermined increment.
   a. If the CSR signal is dominating the UE received power, the gain increase will result in the network closed loop power control lowering the downlink power from the BS (i.e., BS gain) until the SINR at the CSR is lowered to the predetermined Eb/Io goal, and the required Eb/Io at the UE is restored under the lower BS gain condition. In steady state, the power transmitted by the BS will be reduced by the advantage of increased height and equalization at the CSR over the UE (a substantial amount of which will reduce the downlink power from the BS for that channel to a minimum value).
   b. If the BS is dominating the UE downlink when the CSR should be (e.g., the UE's location is further out in the cell than the CSR's location), the received SINR at the CSR will remain excessive (i.e., SINR>predetermined Eb/Io goal). The response of the CSR will be to increase gain until it controls the link. Once the closed loop network power control is controlled by the CSR gain, the transmitted power from the BS will reduce substantially so that the SINR received at the CSR is lowered to the predetermined Eb/Io goal, and the required Eb/Io at the UE is restored under the lower BS gain condition. In this manner, any UE whose downlink channel should be controlled from the CSR, but is not, will eventually be "captured." As a status check, if the CSR power (i.e., CSR gain) is above a power threshold, it periodically reduces power and checks if BS to CSR link responds. If it does not, then the downlink is not controlled by the CSR anymore and the CSR link is slowly dropped. The setting of the selection threshold for SINR can be used to adjust the CSR's reach back into the cell towards the BS.
3. If the CSR does not select a channel for repetition in the first place because the initial BS downlink power is too low to support CSR demodulation of that channel (i.e., the SINR received at the CSR does not meet the initial threshold), that is clearly a UE that is more appropriately served by the BS and will remain so. Given the received gain advantage of the CSR and the ability to set this threshold, the probability of not repeating a downlink that should be repeated by the CSR can be made quite low. Even if a channel is repeated but should not be, the aforementioned logic will turn down the gain for that channel until it is essentially "deselected," as stated in condition 1.

Figure 6:
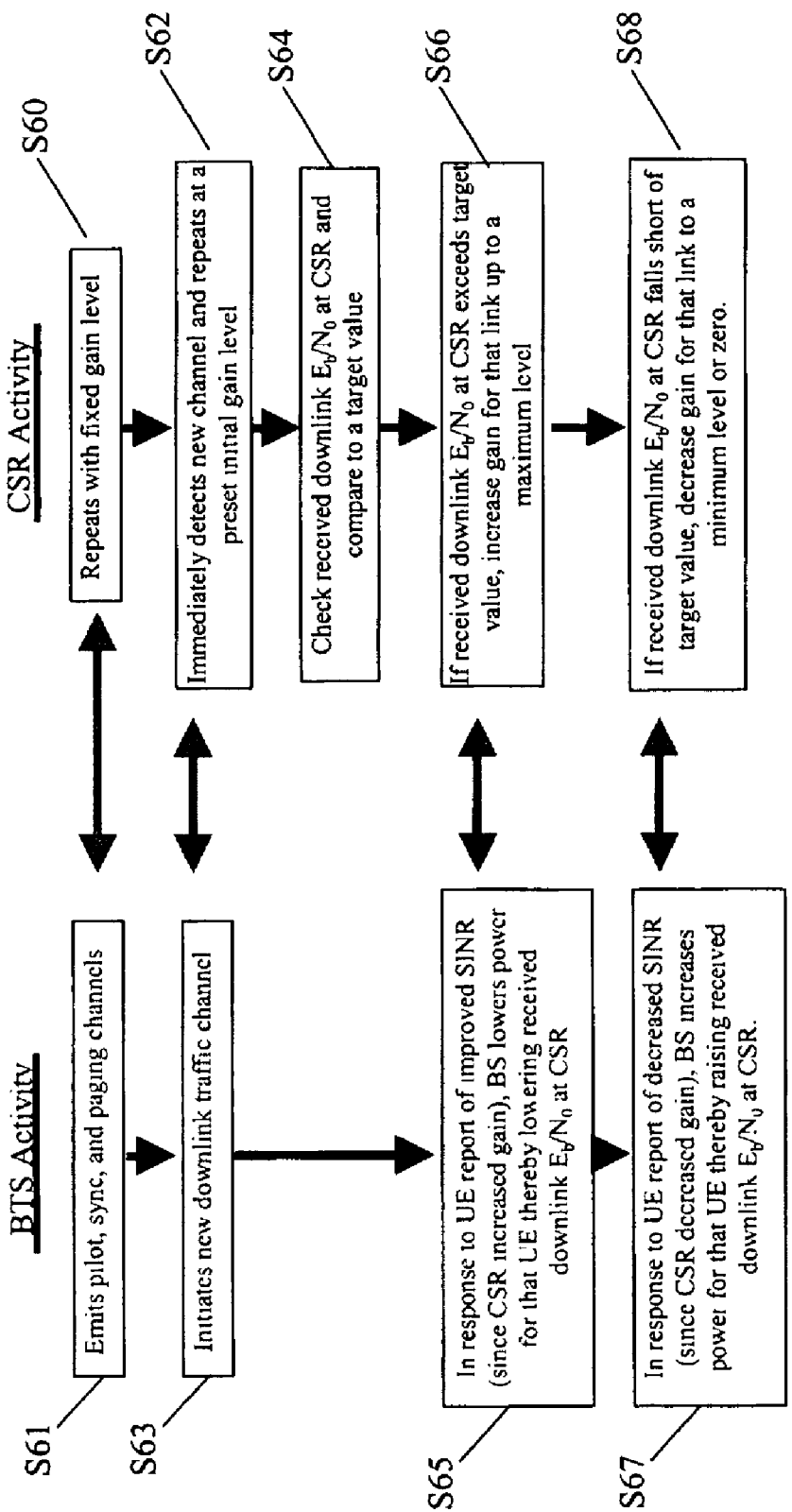
FIG. 6 shows a flow diagram of a channel selection control logic in accordance with an embodiment of the present invention.

An example of the above logic is schematically shown in FIG. 6. For BS activity, the BS in each cell of the wireless network continuously emits control information via typical control channels (e.g., pilot, synchronization, and paging channels) so that authorized UEs can have access to the wireless network, as shown at S61. For CSR activity, each CSR in the cell repeats such control information from the BS with a fixed gain level, as shown at S60. When the BS initiates a new downlink traffic channel at S63, the CSR will immediately detect the new channel and repeat the signals in the new channel at a preset initial gain level if the received SINR at the CSR meets a preset threshold, as shown at S62. Hence, the new downlink channel is selected for repetition by the CSR. At S64, the received SINR at the CSR is further compared to a preset Eb/Io level or goal. At S66, if the SINR is above the preset Eb/Io goal, the CSR will increase the gain for the downlink channel up to the maximum level, as discussed earlier in condition 2. In response to the UE report of improved SINR because of the increased gain from CSR, the BS will lower power for that UE at S65, which will lower the received downlink Eb/Io at the CSR, until the downlink Eb/Io meets the preset Eb/Io goal. However, if the SINR is below the preset Eb/Io goal at S68, the CSR will decrease the gain for the downlink channel to a minimum level or zero so that the CSR does not repeat signals from such channel, as discussed earlier in condition 1. At S67, in response to the UE report of decreased SINR because of the decreased gain from the CSR, the BS will increase power for that UE, thereby raising the received downlink Eb/Io at the CSR to an acceptable level for the UE to connect with the wireless network.

To summarize the gain control loop logic behavior for the downlink in various cases:

1) When the UE is and should be served by the CSR—the gain control loop logic appropriately sets the variable gain level to optimize both the BS-to-CSR link as well as the CSR-to-UE link.

2) When the UE is and should be served by the BS—If the received Eb/Io at the CSR is too low (i.e., less than the predetermined Eb/Io goal), the CSR gain is lowered. Since the UE is not responding to the CSR link, the CSR gain continues to be turned down until it is turned off. If the received Eb/Io at the CSR is too high, the CSR gain is increased incrementally up to the maximum. If the received Eb/Io at the CSR remains high, CSR link is turned down and off. Recall that this condition is unlikely.

3) When the UE is served by the CSR but should be served by the BS (a handoff condition)—As the UE goes in toward the BS, the CSR link degrades. The BS increases power which makes the CSR increase power. Eventually, the CSR power hits a maximum. If the received Eb/Io at the CSR remains high, CSR link is turned down and off and the link is handed off.

4) When the UE is served by the BS but should be served by the CSR (a handoff condition)—As the UE goes in toward the CSR, the BS link degrades. The BS increases power which makes the CSR increase power. Eventually, the CSR will capture the link.

Figure 7:
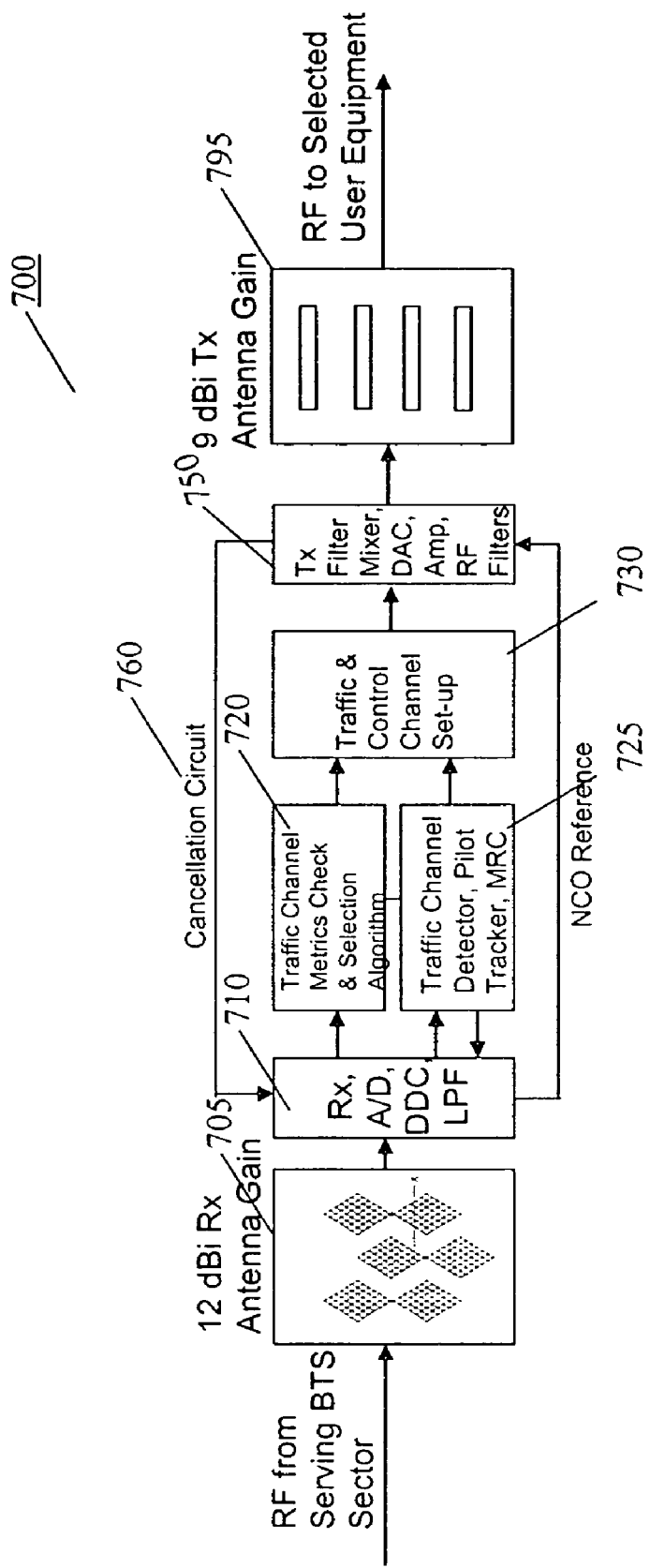
FIG. 7 shows a high level functional block diagram of a CSR implementation in accordance with an embodiment of the present invention.

FIG. 7 shows a functional block diagram 700 of a CSR implementation in accordance with one embodiment of the present invention. The diagram details the processing that is performed on the signal after it is received up to where the signal is transmitted or "echoed." (repeated). The RF signal (downlinked from BS or uplinked from a UE) intercepted at the receive antenna 705 is processed in a receiver subsystem 710 with an analog-to-digital converter (A/D), a low pass filter (LPF), and followed by a digital down converter (DDC). The resulting digital stream is sequentially processed to equalize and demodulate all communication (traffic/data and control) channels by the subsystem 725. An RF cancellation circuit 760 ensures adequate signal isolation between the transmitter subsystem 750 and the receiver subsystem 710.

The subsystem 725 includes circuitry typically found in a cellular phone or other wireless communication devices for receiving incoming signals. Thus, the subsystem 725 provides typical functions such as traffic channel detection (applying the Walsh code), pilot signal tracking, and maximal ratio combining (MRC) processing. The subsystem 725 also demodulates the transport channel bits associated with the communication channels in the received RF signal and may further include the digital equalization filter mentioned earlier. The activities performed by the subsystem 725 can be programmed in and performed by a field programmable gate array (FPGA). The subsystem 720, which can be implemented by a general processor, works concurrently with the subsystem 725 to monitor incoming RF signals and perform the aforementioned channel selection logic to identify which channels are to be constructed and transformed back to RF in the transmitter subsystem 750 for emission by a high-gain transmitter antenna 795. The subsystem 730 includes circuitry typically found in a cellular phone or other wireless communication devices for processing/generating uplink or downlink signals. In this instance, the subsystem 730 provides the typical traffic and control channel set-up, including the reconstruction of DPCCH and DPDDH channels from the transport channel bits that have been demodulated by the subsystem 725, for signals from selected channels to be transmitted as a result of the channel selection logic from the subsystem 720.

Figure 8:
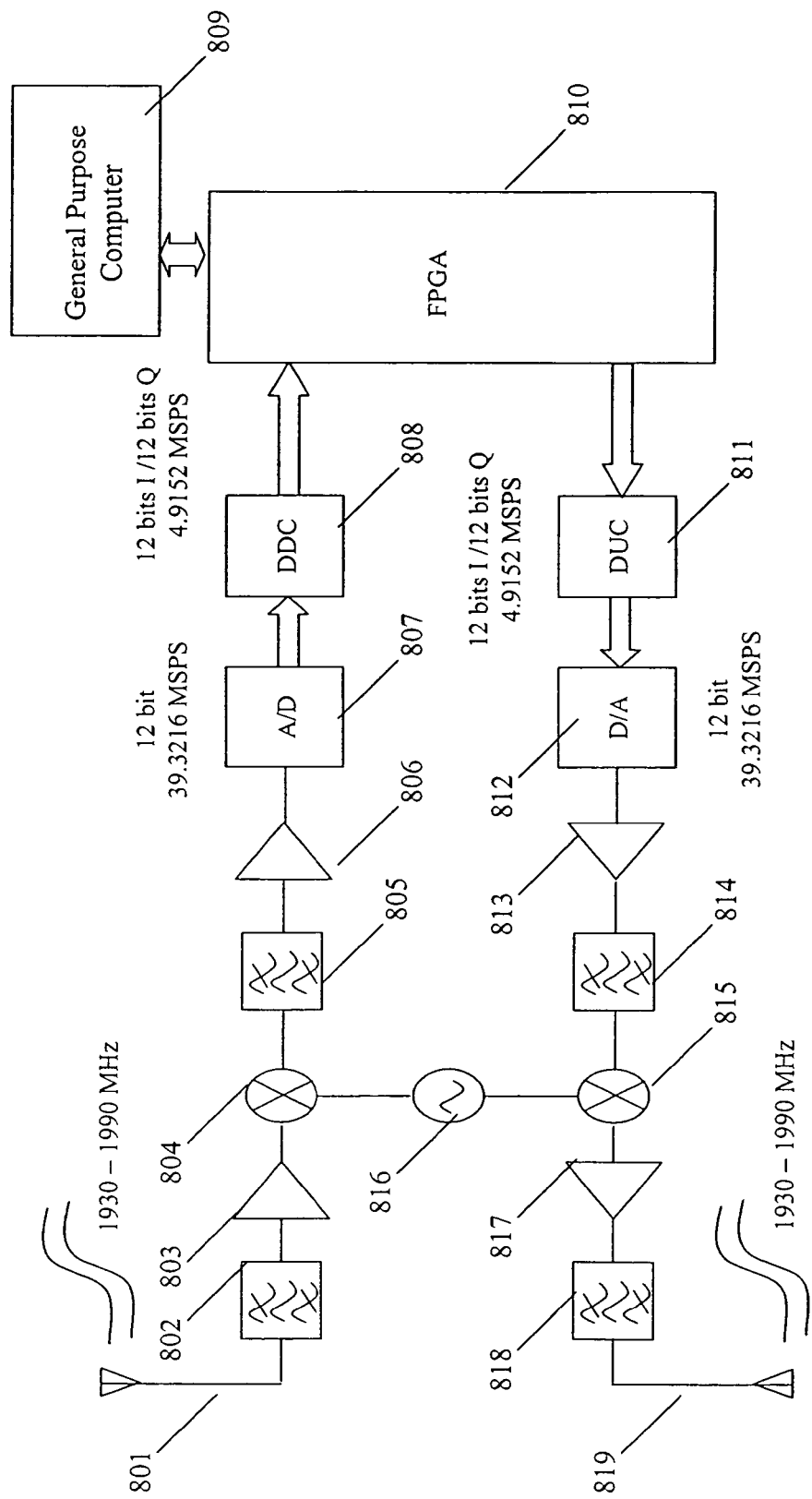
FIG. 8 shows various hardware components for performing the functions in the block diagram of FIG. 7.

FIG. 8 shows a block diagram of representative components included in the CSR to perform the functions listed in FIG. 7. The diagram details the processing that is performed on the signal from reception to re-transmission or echoing. RF signals from the BS and/or UEs are first received by the receiving antenna 801, filtered at 802 to retain only those signals that are within the frequency range required in a CDMA wireless network, and amplified at 803. The antenna 801, filter 802, and RF amplifier 803 correspond to the high gain antenna 705 shown in FIG. 7. Likewise, the high-gain transmitter antenna 795 in FIG. 7 are represented by antenna 819, filter 818, and RF amplifier 817 in FIG. 8. The RF cancellation circuit 760 of FIG. 7 includes the analog cancellation circuit 816 (which also incorporates the local oscillator used for carrier generation), in conjunction with mixers or multipliers 804 and 815, functioning as understood by one skilled in the art, for ensuring adequate isolation between the receiver side and the transmitter side of the CSR. The output of the mixer 804 is then fed to a LPF 805, RF amplifier 806, A/D converter 807, and DDC 808 which are parts of the receiver subsystem 710 shown in FIG. 7. The output of the DDC 808 is fed to a FPGA 810, which handles the functions of the subsystems 725 and 730 shown in FIG. 7 and discussed earlier. The general purpose computer or processor 809, such as a general purpose digital signal processor (GP DSP), is used to handle the traffic channel metrics check and adaptive channel selection logic of the subsystem 720. By designing the logic such that the bulk of the computations for the CSR function is compatible with the architecture of a field programmable gate array (FPGA), such array may be used in a CSR to allow a substantial cost and performance advantage. After the channel selection and traffic and control channel set-up, signals in those channels to be "echoed" by the CSR are combined and output to the digital up-converter (DUC) 811, D/A 812, RF amplifier 813 and filter 814 which are parts of the transmitter subsystem 750 shown in FIG. 7 for modulation. The signals are then transmitted by the high-gain antenna 795 in FIG. 8, as represented by RF amplifier 817, filter 818, and antenna 819. Aside from the standard radio frequency down conversion, filtering, and up conversion, the key signal processing is performed by using both the GP DSP 809 and the FPGA 810.

Figure 9:
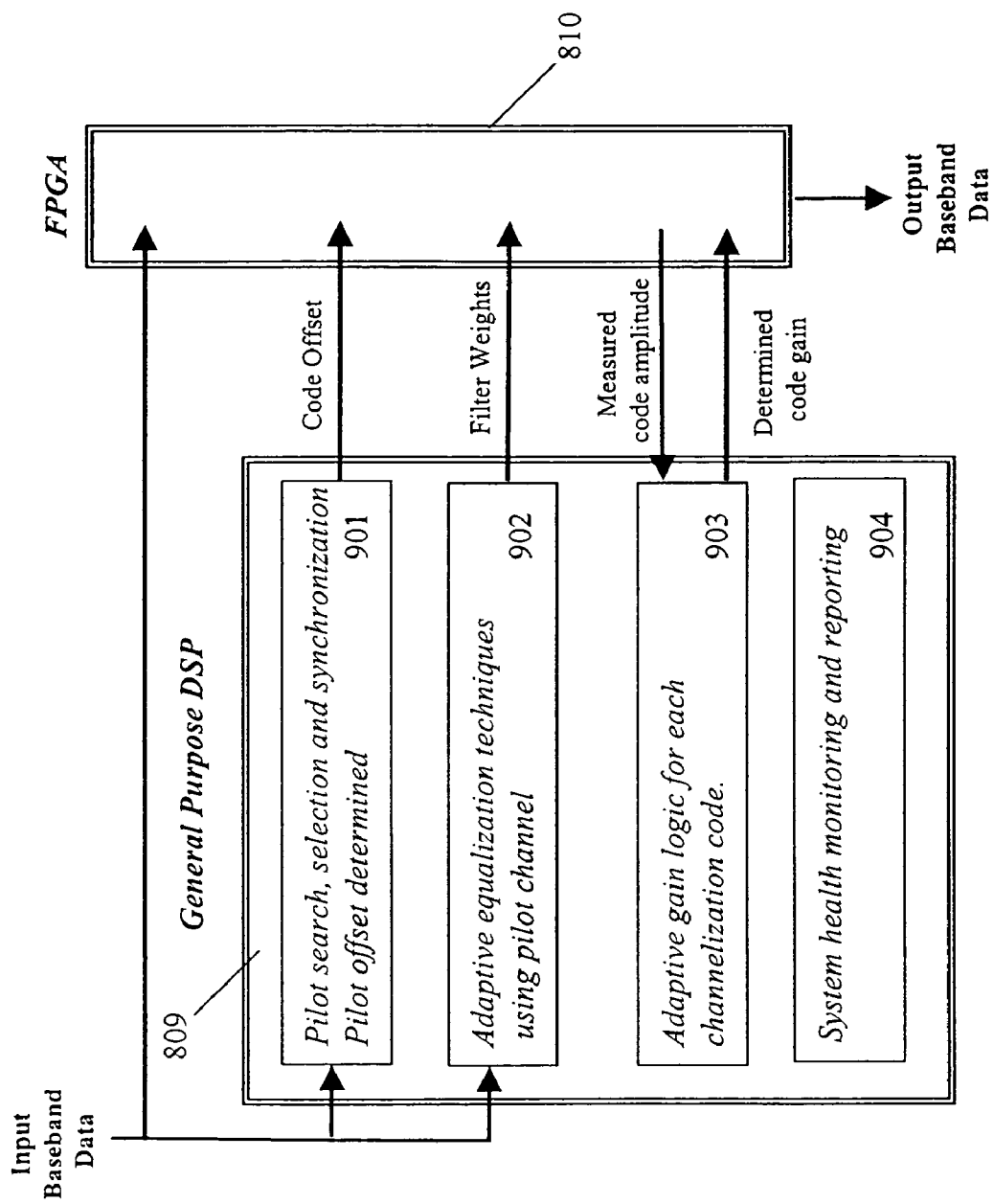
FIG. 9 shows a high level view of the processing tasks undertaken by the FPGA, with each block encompassing a subset of algorithms executed in the FPGA.

FIG. 9 shows the top level interface between the GP DSP 809 and the FPGA 810. As mentioned earlier, the GP DSP 809 may be tasked with the pilot search, selection and synchronization (i.e., pilot signal tracking) at 901 to determine the pilot offset of the input baseband data received from the DDC 807 shown in FIG. 8. This code offset is forwarded to a PLL, as described earlier, that may be implemented in the FPGA 810. The GP DSP 809 also performs adaptive digital equalization techniques, as mentioned earlier, using the detected pilot channel at 902 to derive the filter weights for the digital equalization filter used in the FPGA 810. The GP DSP 809 is, of course, tasked with the adaptive gain logic to determine the gain for each selected channelization code (i.e., selected channel for amplification and re-transmission by the CSR). As described earlier with regard to the channel selective logic, the calculated gain is based on the measured amplitude of each channelization code. At 904, the GP DSP 809 is further tasked with system health monitoring and reporting as previously described in the parent application.

Figure 10:
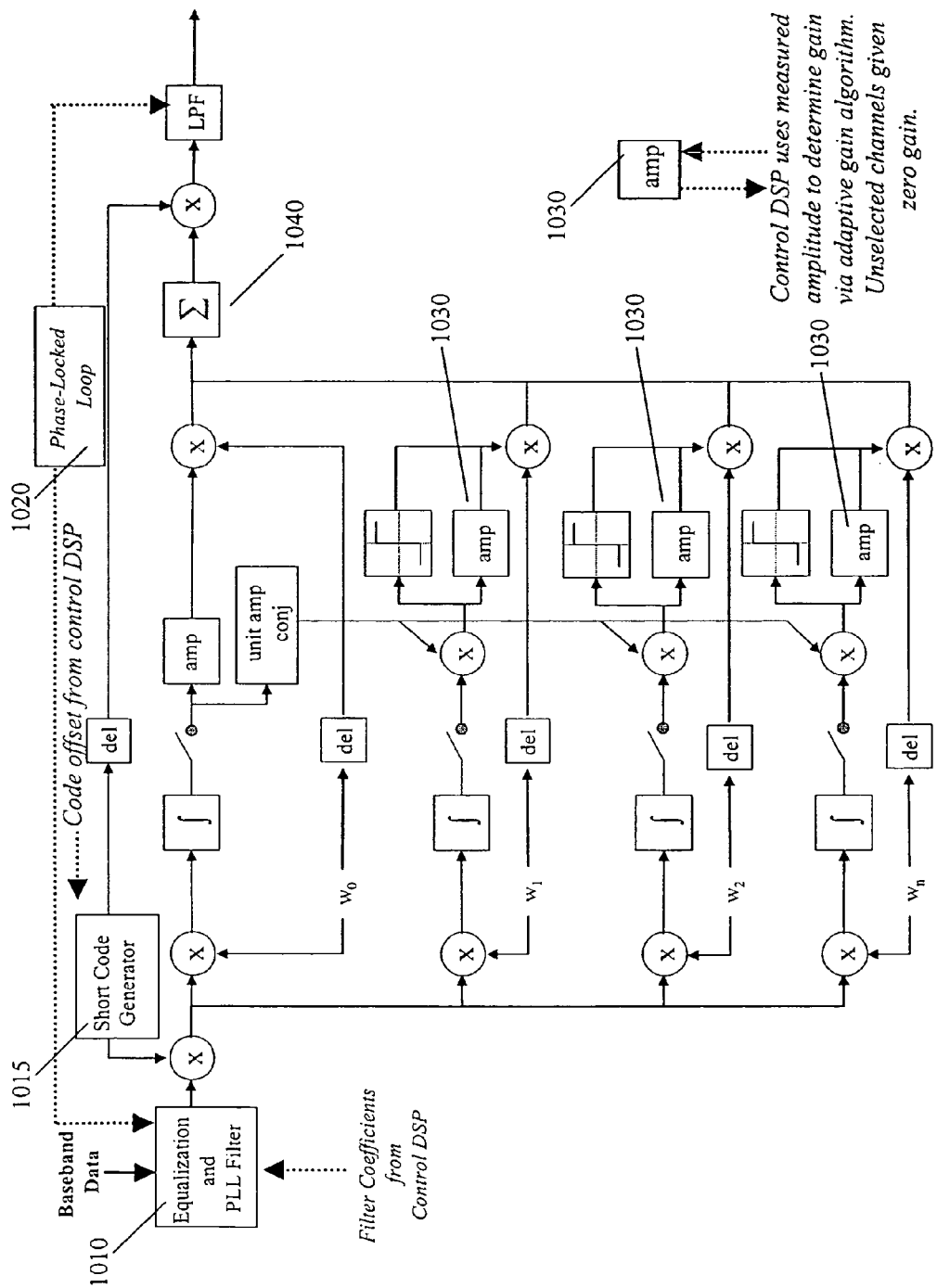
FIG. 10 shows a detailed view of the logic embodied within each RAKE finger of FIG. 9.

FIG. 10 shows the detailed signal processing steps involved in the channel detection, selection, amplification and signal reconstruction in the FPGA 810. Interface points between the GP DSP 809 and the FPGA 810 are denoted by dashed arrows. For instance, the filter coefficients or weights from the GP DSP 809 are sent to the digital equalization and PLL filter 1010. In order to reduce the frequency tolerance requirements, as mentioned earlier, a PLL 1020 driven by the BS pilot channel (via its code offset from the GP DSP 809) is implemented in the FPGA 810 to eliminate residual carrier frequency offsets between the CSR and the BS. Once through the equalization and PLL filter 1010, the baseband data is de-spreaded (i.e., removal of the short PN code) with the short code generator 1015 to obtain the channelization codes $w_0$, $w_1, w_2, \ldots, w_n$, with $w_0$ taken to be the pilot channel per the industry standard specification and $w_n$ denoting the $n^{th}$ channelization code. The transport channel bits carried by each code channel are coherently demodulated based on the pilot channel $w_0$, with the amplitude of each code channel provided back to the GP DSP 809 for code gain calculation based on the adaptive channel selective logic, wherein one or more code channels are selected by setting respective values for the code gains 1030. The selected code channels are then summed or combined at 1040, re-spreaded (i.e., scrambled with the short PN code from the short code generator 1015), and out to the DUC 811 as shown in FIG. 8.

The above-described embodiments of the present invention have been directed to the implementation of CSRs in baseline spread-spectrum wireless networks, i.e., those networks with only BS's and no remote emitters. However, the CSRs of the present invention can also be implemented in wireless networks already augmented with those remote downlink transmitters (RDTs) disclosed in U.S. patent application Ser. No. 09/953,157 to provide the networks with all the benefits provided by the RDTs and CSRs. This is because an RDT will appear to a CSR as a BS, and the CSR does not distinguish signals of an RDT from those of a BS. In an RDT-enhanced wireless network, the CSRs can be added between RDTs and a BS in each network cell and placed between the RDTs and the edges of the cell. The CSRs can also be placed between the BS and an RDT or anywhere else in the cell deemed to be helpful for capacity enhancement.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. A method for selectively repeating RF signals communicated between a base station and a plurality of UEs in a wireless network, comprising:
    receiving an RE signal transmitted from the base station;
    identifying initial communication channels embedded in the RE signal used for downlink communication from the base station to the plurality of UEs, wherein each of the initial communication channels is applied with an associated base gain provided by the base station;
    monitoring a signal-to-interference-plus-noise ratio (SINR) of each of the communication channels;
    upon detecting the SINR of a first one of the initial communication channels reaching a first predetermined threshold, selecting the first initial communication channel and an associated first one of the UEs, and applying a selected gain value to the selected first initial communication channel to generate an amplified version of the first initial communication channel for repetition; and
    firstly determining whether the SINR of the amplified version of the first initial communication channel reaches a second predetermined threshold;
    secondly determining whether the first initial communication channel dominates the amplified version of the first initial communication channel at the associated first UE; and
    varying the associated base gain and/or the selected gain value to maintain a desired value of the SINR at the associated first UE of the dominating one of the first initial communication channel and the amplified version of the first initial communication channel.

2. The method of claim 1, wherein the first initial communication channel dominates the amplified version of the first initial communication channel when the SINR of the first initial communication channel at the associated first UE is greater than the SINR of the amplified version of the first initial communication channel by a predetermined margin.

* * * * *